United States Patent [19]

Chicklis et al.

[11] 4,107,529
[45] Aug. 15, 1978

[54] DUAL MODE SEEKER RETICLE

[75] Inventors: Evan P. Chicklis, Nashua, N.H.;
Charles S. Naiman, Brookline, Mass.;
Kenneth D. Labaugh, Wilton, N.H.

[73] Assignee: Sanders Associates, Inc., Nashua, N.H.

[21] Appl. No.: 805,669

[22] Filed: Jun. 13, 1977

[51] Int. Cl.² .......................... G01J 1/00; G05D 25/00
[52] U.S. Cl. .................................. 250/339; 250/351;
350/274
[58] Field of Search ...................... 250/339, 351, 503;
350/274

[56] References Cited

U.S. PATENT DOCUMENTS

| 3,031,576 | 4/1962 | Loy ........................................ 250/339 |
| 3,034,405 | 5/1962 | Biberman et al. ..................... 350/274 |
| 3,144,555 | 8/1964 | Aroyan et al. ....................... 250/351 |

*Primary Examiner*—Alfred E. Smith
*Assistant Examiner*—Janice A. Howell
*Attorney, Agent, or Firm*—Louis Etlinger; Richard I. Seligman

[57] ABSTRACT

A single reticle is provided having spectral and spatial filtering characteristics such that it may be employed in radiation responsive systems for both passive tracking and active tracking employing a laser target designator.

9 Claims, 12 Drawing Figures

4,107,529

DUAL MODE SEEKER RETICLE

BACKGROUND OF THE INVENTION

Presently certain radiation responsive systems such as conventional heat seeking missiles are extremely effective against "hot targets," targets which passively emit strongly in the infrared spectral region. However, these same systems are ineffective against "cold targets" which must be tracked in conjunction with a target designating laser. On the other hand radiation responsive systems designed for use in conjunction with a target designating laser for tracking "cold targets" are ineffective for tracking "hot targets" when no laser target designator is used. Accordingly, separate systems must be employed for tracking "hot targets" and for use in conjunction with laser designated "cold targets."

SUMMARY OF THE INVENTION

Accordingly, it is an object of this invention to provide an improved reticle.

It is another object of this invention to provide a reticle possessing dual mode capability which will allow tracking both passive "hot targets" and "cold targets" that are actively illuminated by a laser.

It is a further object of this invention to provide an active tracking mode capability to existing heat seeking missiles without compromise of passive mode tracking capability.

Briefly, a single reticle is provided which will allow passive tracking capability together with tracking of an active or laser designated target. The same conventional processing electronics and optical detector can be employed for tracking both the passive and active targets. The reticle is spectrally selective such that at the target designating laser wavelength (which may be chosen to be either outside or within the normal spectral operation band of the passive target tracking seeker) the reticle is preferably transparent within the first semicircular section and opaque within the second semicircular section. Contrawise, the seond semicircular section is substantially 50 percent transmissive throughout the spectral operation band of the passive target tracking reticle while the first semicircular section is divided into radial spokes or checkerboard subsections, which subsections are alternately opaque and transparent throughout the spectral operation band of the passive target tracking reticle, exclusive of the region around the laser wavelength.

BRIEF DESCRIPTION OF THE DRAWINGS

The above mentioned and other features and objects of this invention will become more apparent by reference to the following description taken in conjunction with the accompanying drawings, in which.

DESCRIPTION OF PREFERRED EMBODIMENTS

Figure 1:
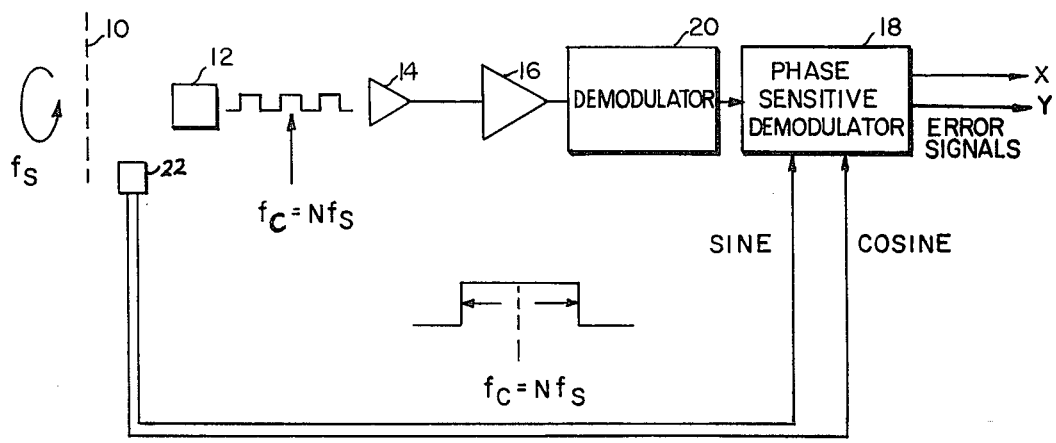
FIG. 1 is a block diagram of a typical passive system for tracking infrared emitting targets and guiding the tracking platform to intercept the target.

A representative system for tracking heat emitting targets is illustrated in FIG. 1 of the drawings and comprises a reticle 10 rotating at a spin frequency $f_S$ the signal from which is applied to a detector 12. The output of detector 12 is coupled to a preamplifier 14 and its output applied to a carrier bandpass amplifier 16. The output of bandpass amplifier 16 is applied to a phase sensitive demodulator 18 via a demodulator 20 which amplitude demodulates the input signal thereto to extract the chopped signal's envelope at spin frequency $f_S$. Phase sensitive demodulator 18 receives as second inputs thereto the sine and cosine outputs from a reticle spin frequency reference detector 22. Reference detector 22 indicates when a reference point on reticle 10 passes the detector.

The phase sensitive demodulator 18 compares the signal from AM demodulator 20 and the reference signals from reference detector 22 and puts out two d.c. signals, both of which are proportional to the magnitude of the tracking error angle minus the reference angle while the $x$ output is also proportional to the cosine of the error angle and the $y$ output is also proportional to the sine of the error angle minus the reference angle. The signals are employed to steer the device in which the seeker is incorporated such that the seeker will intercept the target. This system is described only to form some background as to the use of tracking reticles and forms no part of the present invention.

Figure 2A:
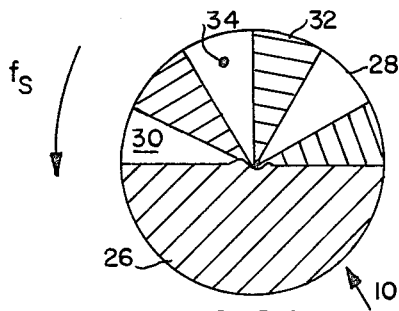
FIG. 2A is an illustration of a typical reticle employed in passively tracking heat emitting targets.

A typical reticle 10 employed in the system of FIG. 1 for passively tracking heat emitting targets is shown in FIG. 2A of the drawings and comprises a semicircular portion 26 constructed such that substantially 50 percent of the radiation in the spectral band of interest received thereby will be transmitted. The other semicircular portion 28 of the reticle 10 comprises spokes 30 which transmit substantially 100 percent at the spectral band of interest and spokes 32 which are substantially opaque at the wavelengths of interest.

Figure 2B:
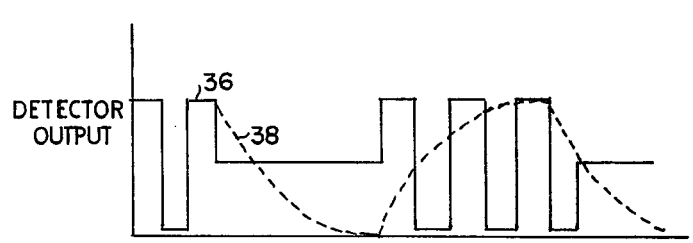
FIG. 2B is an illustration of the signal derived from the reticle of FIG. 2A.

A point target 34 imaged through the reticle on to a detector produces a signal 36 which is shown in solid lines in FIG. 2B. This signal has a carrier frequency $f_C$ wherein $f_C$ is equal to $f_S$, the spin frequency to reticle 10, times a factor equal to the number of spoke pairs which would be present if the spoke pair pattern were extended around the entire reticle. In the example of FIG. 2A, this factor (the number of fullcircle equivalent spoke pairs) is six. It is this signal which is applied to demodulator 20 of FIG. 1 to provide the envelope thereof 38 shown in dashed lines in FIG. 2B.

While reticle 10 is adequate for conventional passive heat seeking systems, it is inadequate for detecting targets which are designated by a pulsed laser since laser target designators do not illuminate the target with a continuous signal but rather with a pulsed signal. Seekers employed with laser target designators employ a reticle which is capable of tracking a pulsed source. A typical one is shown in FIG. 3A of the drawings.

Figure 3A:
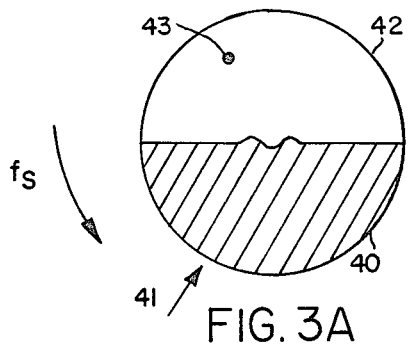
FIG. 3A is an illustration of a reticle employed in tracking laser designated targets.
Figure 3B:
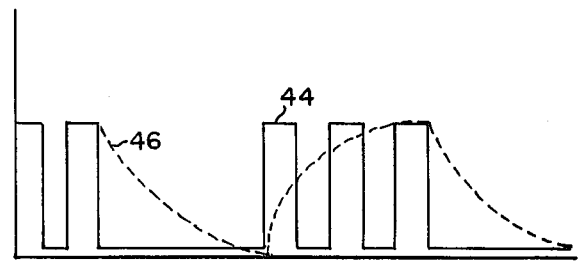
FIG. 3B is an illustration of the signal derived from the reticle of FIG. 3A.

The reticle 41 of FIG. 3A comprises a hemispherical portion 40 which is substantially opaque at the laser wavelengths of interest and a hemispherical portion 42 which is substantially 100 percent transmitting at the laser wavelengths of interest. A typical output from such a reticle from a point target 43 is shown in FIG. 3B of the drawings comprising a number of pulses shown in solid lines 44 at the pulse repetition frequency of the laser target designator.

If the laser target designator has a pulse repetition frequency within the carrier bandpass amplifier 16 passband then when the output of reticle 41 is demodulated by the system of FIG. 1 the detected envelope at frequency $f_S$ (as indicated by dashed lines 46 of FIG. 3B) will be equivalent to the envelope of the detected output of the reticle of FIG. 2A as shown in FIG. 2B. While reticle 41 is adequate for systems employing pulsed laser target designators, it is inadequate for conventional passive heat seeking devices since it has no spokes thereon and the phasing sector is not 50 percent transmissive and there will be, accordingly, no discrimination between the targets and clutter generated by sunlit clouds and other IR background sources.

In accordance with the principles of this invention, passive tracking capability together with tracking of a laser designated target is possible by employing a single reticle which is a spectral composite of reticles 10 and 41 of FIGS. 2A and 3A. No changes to the processing electronics of FIG. 1 is required when employing such a composite reticle.

Recognizing that passive thermal targets radiate strongly in one or more spectral regions and that it is possible to illuminate other targets with a laser in either a different spectral region or the same spectral region with appropriate filtering techniques, a reticle can be provided which combines the features of each of the reticles of FIGS. 2A and 3A in a single unit. In view of this the same detection system can suffice for both types of targets.

Figure 4A:
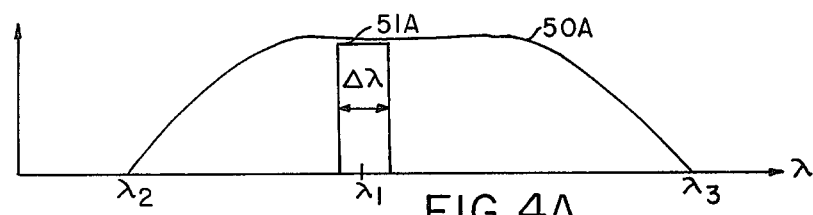
FIGS. 4A and 4B are graphical representations of the spectral operational bands of the passive seeker and laser target designator employing this invention.
Figure 4B:
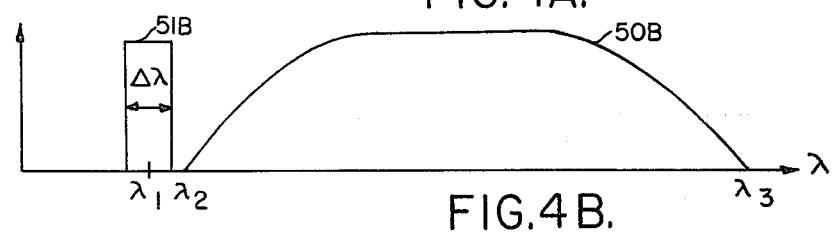

Referring now to FIGS. 4A and 4B there is shown an exemplary radiation pattern of a typical heat radiating target as indicated by the lines 50A and 50B. It is seen that the passive target radiates in a wavelength band from $\lambda_2$ to $\lambda_3$. Accordingly, the reticle according to the invention should provide a signal like that shown in FIG. 2B for passive targets in the spectral band from $\lambda_2$ to $\lambda_3$. In order to provide a single reticle suitable for both active (laser target designated) targets and passive targets the wavelength regions of the target designating laser and of the passive tracking seeker must be mutually exclusive, i.e., there must be minimal overlap between the two spectral regions. The wavelength region of the target designating laser is in a band illustrated by lines 51A and 51B of FIGS. 4A and 4B which is centered about wavelength $\lambda_1$. Proper design of the reticle section spectral transmission functions will result in a single reticle which will provide at $\lambda_1$ a waveform like that shown in FIG. 3B of the drawings and also in the spectral region from $\lambda_2$ to $\lambda_3$, exclusive of the laser designator region about $\lambda_1$, a waveform like that shown in FIG. 3A of the drawings.

Figure 5:
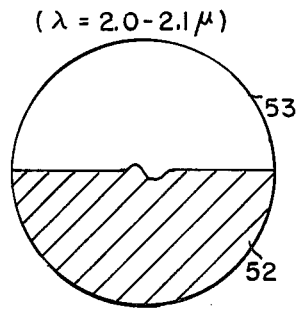
FIG. 5 is an illustration of one general embodiment of a single reticle employed in the practice of this invention.
Figure 5:
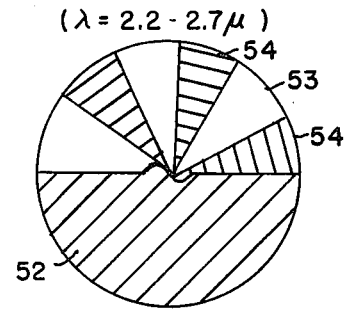

Such a reticle is shown in FIG. 5 of the drawings. Although two patterns are illustrated in FIG. 5, in fact, only a single reticle is employed having the characteristics of the combined two patterns. It is only for clarity that the spectral characteristics are shown in separate illustrations.

In the portion of the reticle illustrated on the left of FIG. 5, the upper semicircular portion 53 is constructed to have a substantially 100 percent transmissivity at a wavelength $\lambda_1$ while the bottom semicircular portion 52 has substantially no transmissivity at $\lambda_1$. The single reticle also has the features as illustrated by the right hand portion of FIG. 5, specifically 50 percent transmissivity in the lower semicircular portion 52 at a band of wavelengths between $\lambda_2$ and $\lambda_3$, exclusive of the region above $\lambda_1$, and 100 percent transmissivity at the spectral region of $\lambda_2$ through $\lambda_3$ in the upper semicircular portion 53, except for portions 54 which have substantially zero transmissivity at the region between $\lambda_2$ and $\lambda_3$, exclusive of the region about $\lambda_1$.

Figure 6A:
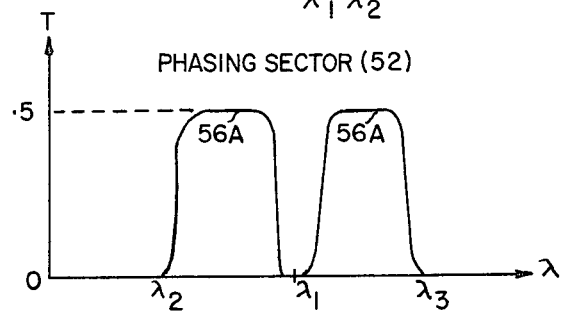
FIGS. 6A, 6B and 6C are graphical representations of the spectral transmission characteristics of the three general spectral cases in which this invention as embodied in the reticle of FIG. 5 can be implemented.
Figure 6A:
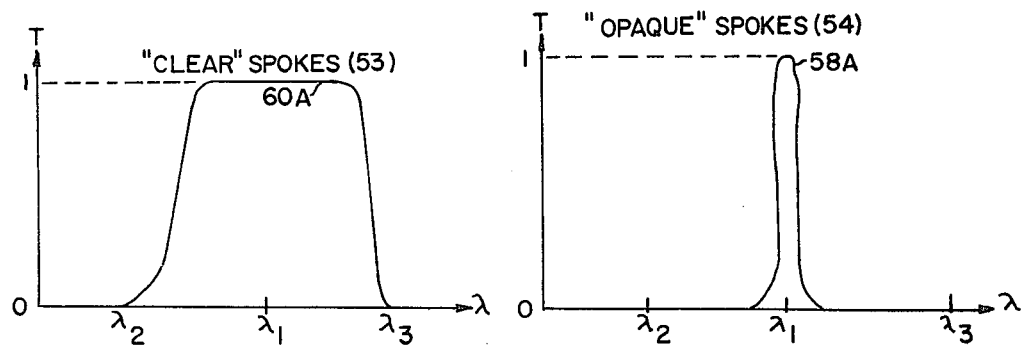
Figure 6B:
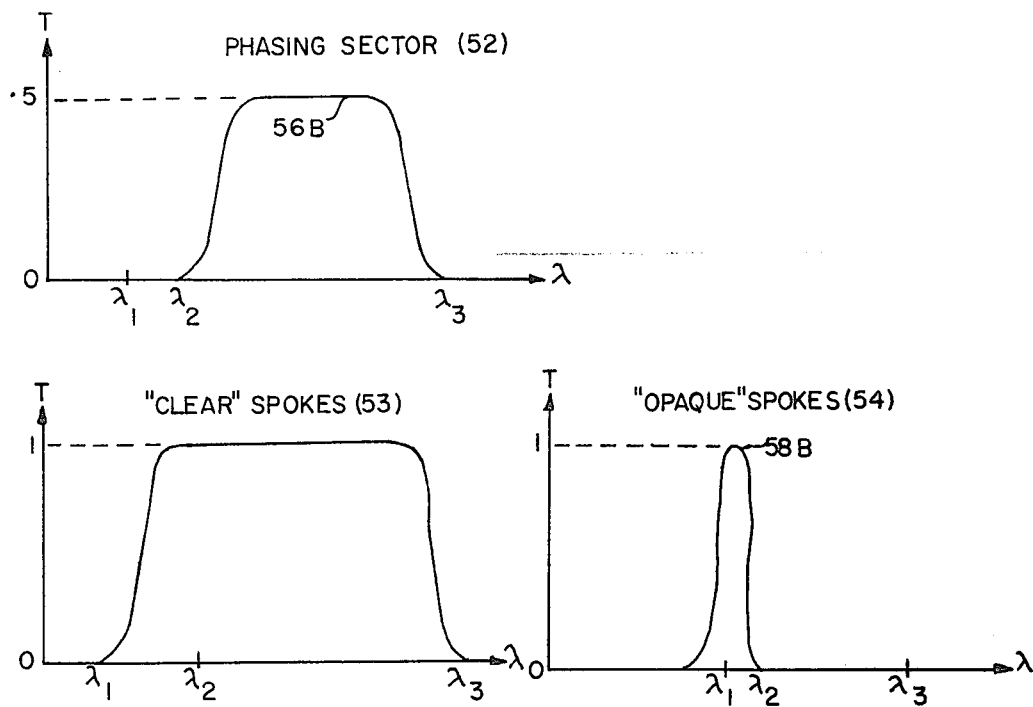
Figure 6C:
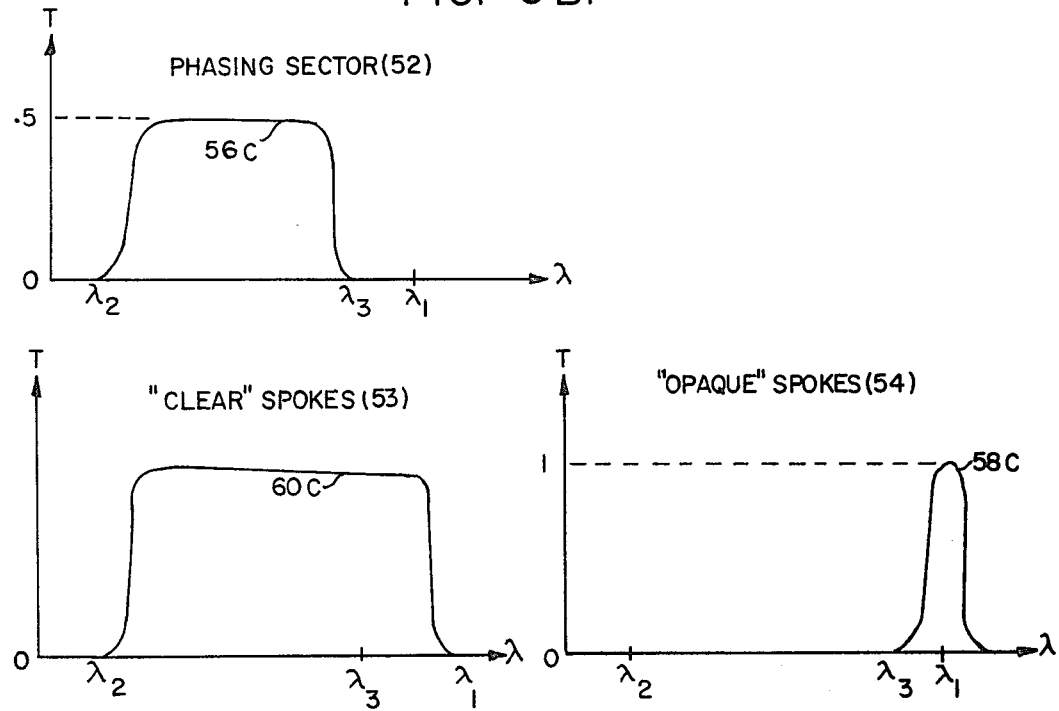

FIGS. 6A, 6B and 6C illustrate the spectral reticle section transmission functions which are required for the construction of a single dualmode reticle. The figures show the transmission of the phasing sector to be 50% in the passive tracking band from $\lambda_2$ to $\lambda_3$, except in the narrow region about the designator region $\lambda_1$. The "clear" spoke spectral transmission is substantially 100% in both the passive tracker and designator laser wavelength region. The "Opaque" spokes spectral transmission is substantially 100% in the designator laser wavelength region and 0% elsewhere. FIG. 6A illustrates the above spectral transmission functions for the case in which the designator laser wavelength is within the passive tracker spectral band, i.e., $\lambda_2 < \lambda_1, < \lambda_3$. FIG. 6B illustrates the above spectral transmission functions for the case in which the designator laser wavelength is at a wavelength shorter than the wavelengths in the passive trackers spectral band, i.e., $\lambda, < \lambda_2 < \lambda_3$. A third case, illustrated in FIG. 6C is that in which the designator laser wavelength is longer than the wavelengths in the passive tracker spectral band, i.e., $\lambda_2 < \lambda_3 < \lambda_1$. This last case is conceptually very similar to that in FIG. 6B.

One particular wavelength useful for target designating is the two micron region because hot metal parts of heat emitting targets emit strongly in the atmospheric window from 2 to 2.5 microns. One particular laser aptly suited for this application is a Ho:LiYF$_4$:Er-Tm sensitized crystal which lases at 2.06 microns. This 2.06 micron laser is desirable since it exhibits high peak and average power at high repetition rates and is compatible with detectors of present heat seeking missiles. Two micron designation is superior than one micron laser target designators presently favored by the military because of lower solar background and atmospheric scattering in the 2 micron region.

Figure 7:
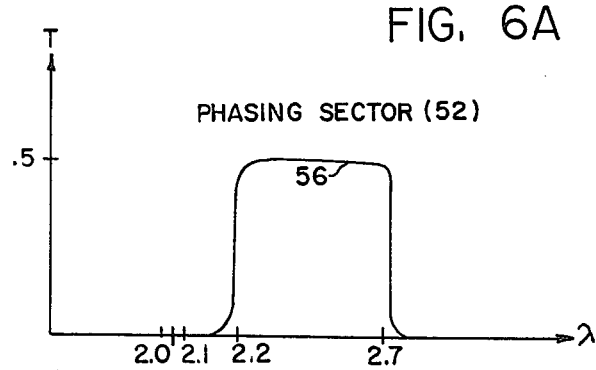
FIG. 7 is a graphical represenation of the spectral characteristics of a specific embodiment of the reticle of FIG. 5.
Figure 7:
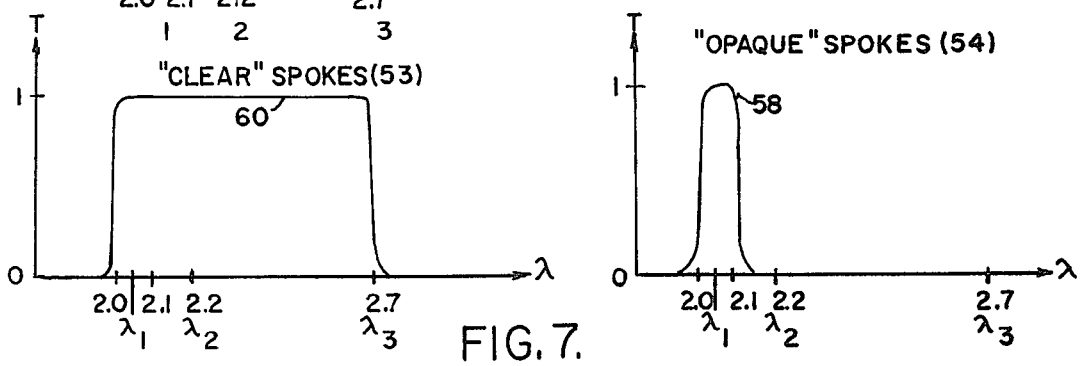

If a reticle is employed for use with a laser target designator of 2.06 microns, preferable in the example of FIG. 5, applying the general case shown in FIG. 6B, section 52 of the reticle would have substantially zero transmission in the wavelength region from 2.0 to 2.1 microns and 50 percent transmission in the wavelength region from 2.2 to 2.7 microns. The upper section 53 of the reticle would be 100 percent transmissive from 2.0 to 2.1 microns and 100 percent transmissive from 2.2 to 2.7 microns except for those "opaque" regions 54 which would have zero transmission from 2.2 to 2.7 microns. FIG. 7 illustrates graphically the spectral characteristics of such a reticle.

The lines 56 illustrate the phasing section 52 of the reticle where it is noted that the transmissivity of this portion of the reticle is substantially zero except in the 2.2 to 2.7 micron region whereupon it becomes 50 percent. The line portion 58 of this diagram illustrates transmission of the "opaque" spoked regions 54 of the upper portion of the reticle where it is shown that transmission is 100 percent in the 2.0 to 2.1 micron region and then falls to substantially zero on either side. The remainder of the upper portion 53 is substantially 100 percent transmissive for the entire region between 2.0 and 2.7 microns as illustrated by the line 60.

While the invention has been illustrated in accordance with a particular reticle pattern and in conjunction with a particular target designating laser this is only by way of example and other lasers operating at the same or different wavelengths and other reticle patterns may be employed in accordance with the teachings of the invention. Thus, it is to be understood that the embodiments shown are illustrative only and that many variations and modifications may be made without departing from the principles of the invention herein disclosed and defined by the appended claims.

We claim:

1. Apparatus for modulating radiation from active laser designated targets emitting at a wavelength of substantially $\lambda_1$ and passive targets emitting in the spectral region between $\lambda_2$ and $\lambda_3$, comprising:
    a single reticle responsive to radiation from targets;
    said reticle having first and second portions, each of said portions having a different transmissivity characteristics for radiation at $\lambda_1$ and radiation between $\lambda_2$ and $\lambda_3$; and
    said reticle providing a similar output for radiations at $\lambda_1$ and radiations between $\lambda_2$ and $\lambda_3$.

2. Apparatus as defined in claim 1, wherein said first portion of said reticle is a phasing portion.

3. Apparatus as defined in claim 2, wherein said phasing portion is substantially opaque at $\lambda_1$ and substantially 50 percent transmissive between $\lambda_2$ and $\lambda_3$, exclusive of the narrow region about $\lambda_1$.

4. Apparatus as defined in claim 1, wherein said first and second portions are substantially semicircular.

5. Apparatus as defined in claim 1, wherein said second portion of said reticle is divided into at least first and second sections.

6. Apparatus as defined in claim 5, wherein said first section of said second portion of said reticle is substantially transparent at $\lambda_1$ and between $\lambda_2$ and $\lambda_3$.

7. Apparatus as defined in claim 6, wherein said second section of said second portion of said reticle is substantially transparent at $\lambda_1$ and substantially opaque between $\lambda_2$ and $\lambda_3$, exclusive of the narrow region about $\lambda_1$.

8. Apparatus as defined in claim 7, wherein $\lambda_1$ is substantially 2.06 microns.

9. Apparatus as defined in claim 1, wherein the radiation at $\lambda_1$ is pulsed radiation and the radiation between $\lambda_2$ and $\lambda_3$ is continuous radiation.